(12) United States Patent
Itakura et al.

(10) Patent No.: US 8,797,481 B2
(45) Date of Patent: Aug. 5, 2014

(54) LIQUID CRYSTAL DISPLAY DEVICE COMPRISING A PLURALITY OF FIRST AND SECOND LIGHT-EMITTING DIODES RESPECTIVELY CONNECTED TO FIRST AND SECOND CONNECTORS

(75) Inventors: Shimon Itakura, Mobara (JP); Masaki Tsubokura, Mobara (JP)

(73) Assignees: Japan Display Inc., Tokyo (JP); Panasonic Liquid Crystal Display Co., Ltd., Hyogo (JP)

( * ) Notice: Subject to any disclaimer, the term of this patent is extended or adjusted under 35 U.S.C. 154(b) by 291 days.

(21) Appl. No.: 13/079,060

(22) Filed: Apr. 4, 2011

(65) Prior Publication Data
US 2011/0242458 A1 Oct. 6, 2011

(30) Foreign Application Priority Data
Apr. 5, 2010 (JP) .................................. 2010-086704

(51) Int. Cl.
*G02F 1/1335* (2006.01)
*G09F 13/04* (2006.01)
*F21V 7/04* (2006.01)

(52) U.S. Cl.
USPC ............................ 349/65; 362/97.3; 362/612

(58) Field of Classification Search
CPC .............. G02F 1/133621; G02F 2001/133607; G02F 1/133611
USPC ...................... 349/61–65; 362/600, 611, 612, 362/97.2–97.4
See application file for complete search history.

(56) References Cited

U.S. PATENT DOCUMENTS
2010/0157197 A1* 6/2010 Lee et al. ......................... 349/62

FOREIGN PATENT DOCUMENTS
JP        2002-075038        3/2002

* cited by examiner

*Primary Examiner* — Paul Lee
(74) *Attorney, Agent, or Firm* — Antonelli, Terry, Stout & Kraus, LLP.

(57) ABSTRACT

Provided is a liquid crystal display device, including: a light guide plate; first light-emitting diodes and a first connector, which are opposed to a first side surface of the light guide plate; a first substrate on which the first light-emitting diodes and the first connector are mounted; second light-emitting diodes and a second connector, which are opposed to a second side surface of the light guide plate, the second side surface being on a side opposite to the first side surface; and a second substrate on which the second light-emitting diodes and the second connector are mounted, in which: the first connector is opposed to any one of the second light-emitting diodes; the second connector is opposed to any one of the first light-emitting diodes; and the first connector and the second connector are disposed without being opposed to each other.

13 Claims, 7 Drawing Sheets

LIQUID CRYSTAL DISPLAY DEVICE COMPRISING A PLURALITY OF FIRST AND SECOND LIGHT-EMITTING DIODES RESPECTIVELY CONNECTED TO FIRST AND SECOND CONNECTORS

CROSS-REFERENCE TO RELATED APPLICATION

The present application claims priority from Japanese application JP 2010-086704 filed on Apr. 5, 2010, the content of which is hereby incorporated by reference into this application.

BACKGROUND OF THE INVENTION

1. Field of the Invention

The present invention relates to a liquid crystal display device.

2. Description of the Related Art

A light-emitting diode has been used as a light source of a backlight of a liquid crystal display device (Japanese Patent Application Laid-open No. 2002-75038). The light-emitting diode is used for a backlight of a side-light type or an edge-light type. A plurality of light-emitting diodes as point light sources are arranged on a side surface of a light guide plate, thereby converting the point light sources into a planar light source. Further, in order to achieve uniform brightness over a light-emitting surface, the plurality of light-emitting diodes are arranged at equal pitches.

The light-emitting diodes are mounted on a substrate, and are connected to a cable via a connector. Therefore, the light-emitting diode does not exist in a region at which the connector is disposed, which leads to a problem that the brightness decreases.

SUMMARY OF THE INVENTION

The present invention has an object to provide a liquid crystal display device capable of achieving uniform brightness in a backlight.

(1) A liquid crystal display device according to the present invention includes: a liquid crystal display panel; a light guide plate, which is provided to form an edge-light type backlight; a plurality of first light-emitting diodes, which are disposed so as to be opposed to a first side surface of the light guide plate; a first connector, which is disposed so as to be opposed to the first side surface of the light guide plate, and is electrically connected to the plurality of first light-emitting diodes; a first substrate on which the plurality of first light-emitting diodes and the first connector are mounted; a plurality of second light-emitting diodes, which are disposed so as to be opposed to a second side surface of the light guide plate, the second side surface being on aside opposite to the first side surface; a second connector, which is disposed so as to be opposed to the second side surface of the light guide plate, and is electrically connected to the plurality of second light-emitting diodes; and a second substrate on which the plurality of second light-emitting diodes and the second connector are mounted, in which: the first connector is disposed so as to be opposed to any one of the plurality of second light-emitting diodes; the second connector is disposed so as to be opposed to any one of the plurality of first light-emitting diodes; and the first connector and the second connector are disposed without being opposed to each other. According to the present invention, the second light-emitting diode is provided opposed to the first connector and the first light-emitting diode is provided opposed to the second connector. Therefore, it is possible to maintain a bright state. Thus, uniform brightness can be achieved in the backlight.

(2) In the liquid crystal display device as described in Item (1), the plurality of first light-emitting diodes may include: the first light-emitting diodes which are arranged in a row in a length direction of the first side surface; and the first light-emitting diodes which are arranged in a plurality of levels in a thickness direction of the light guide plate at a portion adjacent to the first connector, and the plurality of second light-emitting diodes may include: the second light-emitting diodes which are arranged in a row in a length direction of the second side surface; and the second light-emitting diodes which are arranged in a plurality of levels in the thickness direction of the light guide plate at a portion adjacent to the second connector.

(3) In the liquid crystal display device as described in Item (1) or (2), at least one of the plurality of first light-emitting diodes may be disposed on each end portion side of the first side surface with respect to the first connector, and at least one of the plurality of second light-emitting diodes may be disposed on each end portion side of the second side surface with respect to the second connector.

(4) In the liquid crystal display device as described in any one of Items (1) to (3), the first substrate may be divided into a plurality of first divided substrates in a middle of the length direction of the first side surface, and the second substrate may be divided into a plurality of second divided substrates in a middle of the length direction of the second side surface.

(5) In the liquid crystal display device as described in Item (4), the first connector may be mounted on each of a pair of the first divided substrates, at least one of the plurality of first light-emitting diodes may be disposed between the first connector mounted on one of the pair of the first divided substrates and the first connector mounted on another of the pair of the first divided substrates, the second connector may be mounted on each of a pair of the second divided substrates, and at least one of the plurality of second light-emitting diodes may be disposed between the second connector mounted on one of the pair of the second divided substrates and the second connector mounted on another of the pair of the second divided substrates.

DETAILED DESCRIPTION OF THE INVENTION

Figure 1:
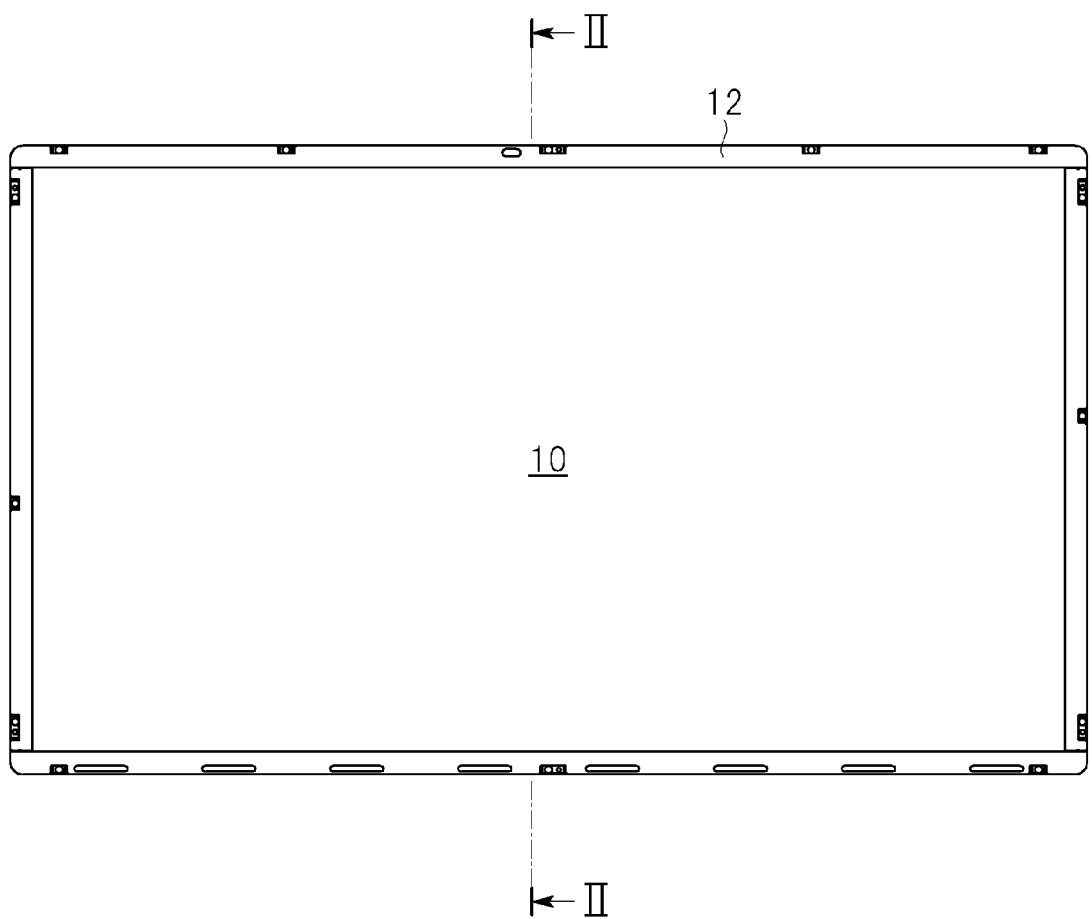
FIG. 1 is a plan view of a liquid crystal display device according to an embodiment of the present invention.
Figure 2:
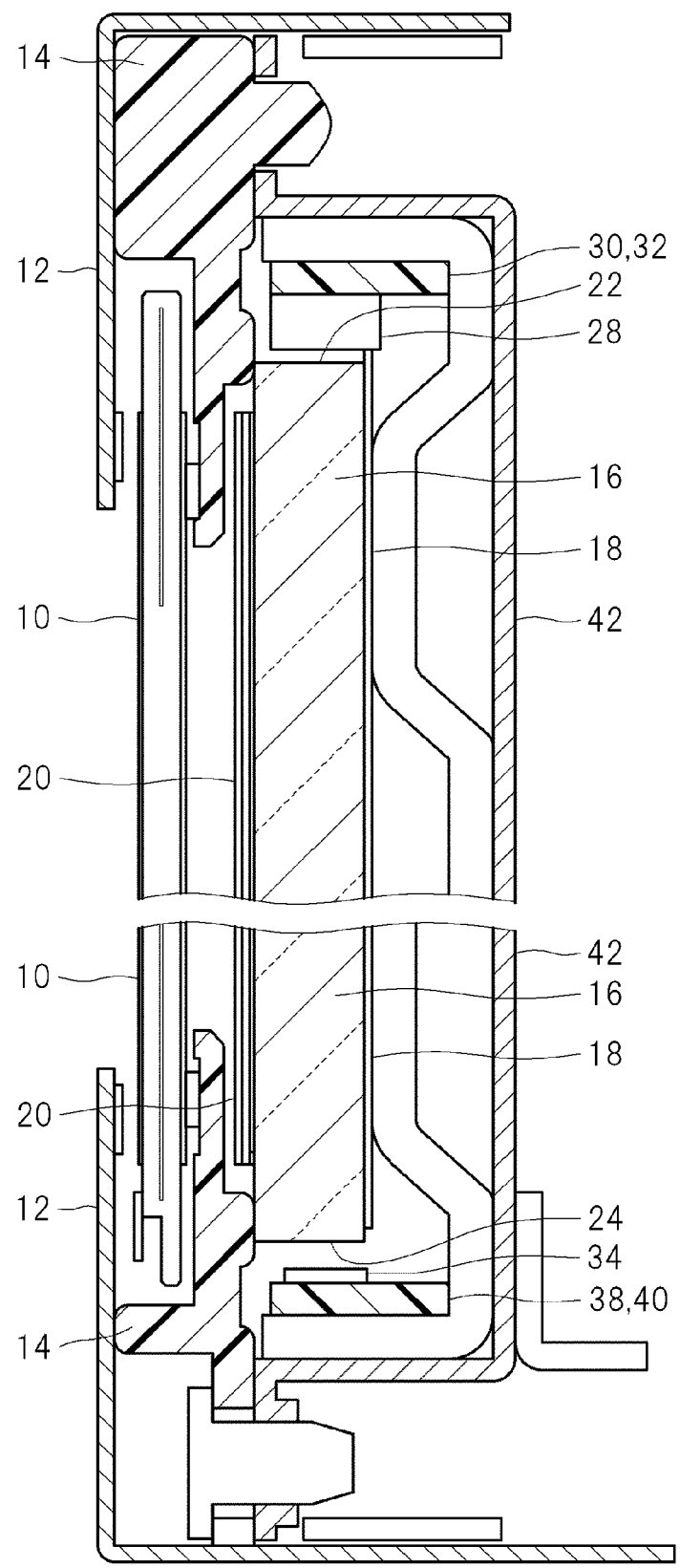
FIG. 2 is an enlarged sectional view of the liquid crystal display device taken along the line II-II of FIG. 1.

Hereinafter, an embodiment of the present invention is described with reference to the drawings. FIG. 1 is a plan view of a liquid crystal display device according to the embodiment of the present invention. FIG. 2 is an enlarged sectional view of the liquid crystal display device taken along the line II-II of FIG. 1.

The liquid crystal display device includes a liquid crystal display panel 10. The liquid crystal display panel 10 includes a pair of substrates made of glass or the like, and liquid crystal (not shown) sandwiched therebetween. The liquid crystal display panel 10 includes polarizing plates disposed on both sides thereof.

A peripheral edge portion of a front surface (surface on a display side) of the liquid crystal display panel 10 is held by an upper frame 12. Further, a peripheral edge portion of a rear surface (surface on a side opposite to the front surface) of the liquid crystal display panel 10 is held by a mold frame 14.

Figure 3:
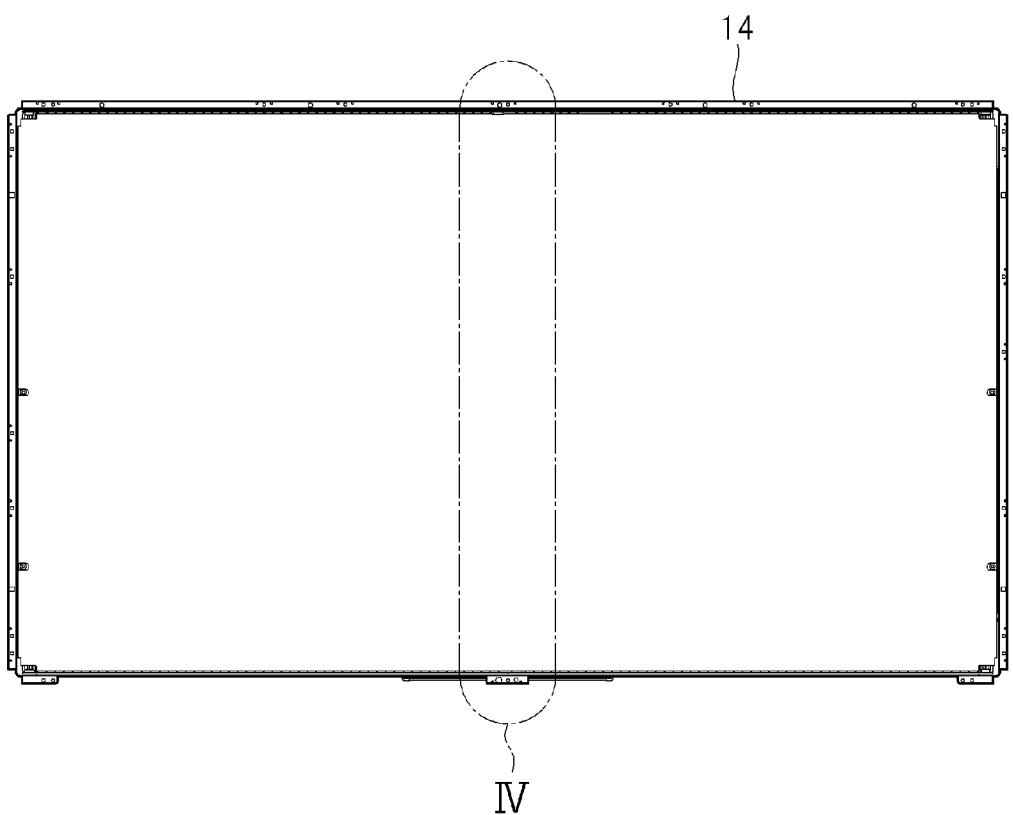
FIG. 3 is a view illustrating a structure in which an upper frame and a liquid crystal display panel are detached from the liquid crystal display device illustrated in FIG. 1.
Figure 4:
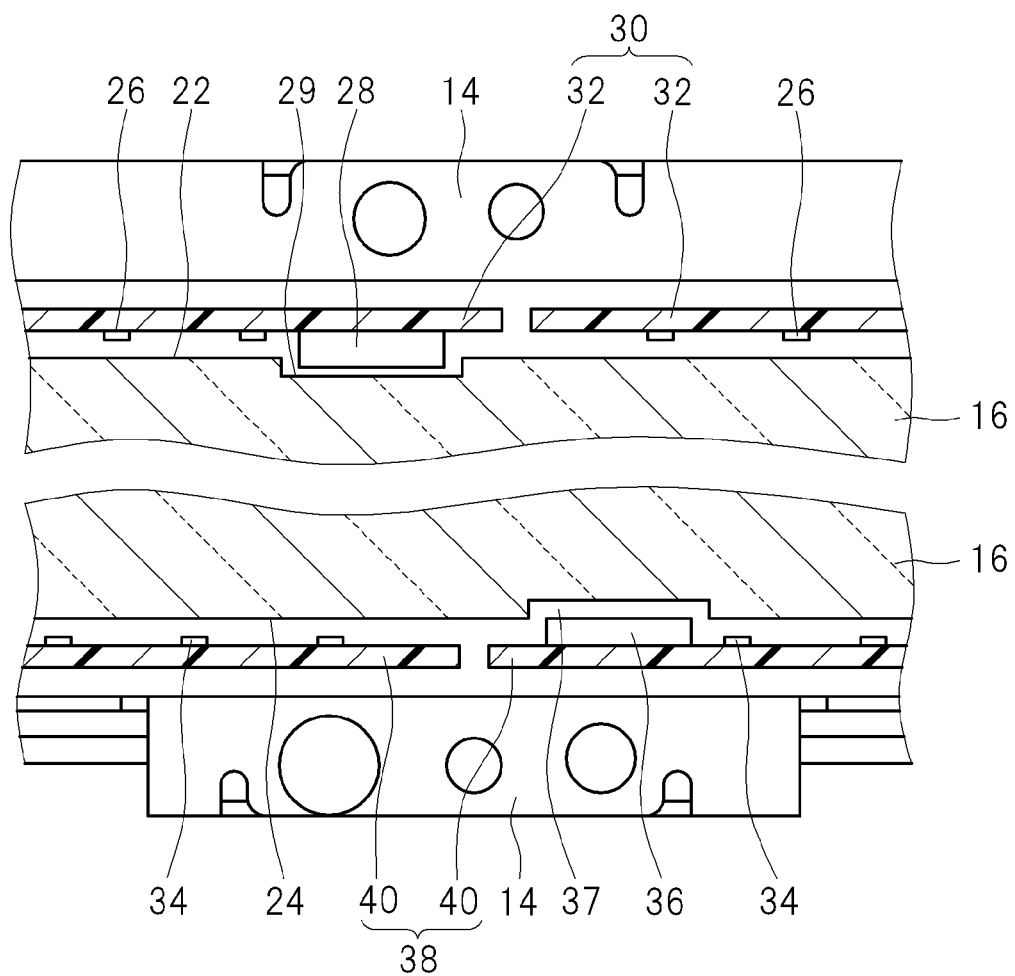
FIG. 4 is an enlarged view of a portion encircled by a dashed-dotted line in the liquid crystal display device illustrated in FIG. 3.

FIG. 3 is a view illustrating a structure in which the upper frame and the liquid crystal display panel are detached from the liquid crystal display device illustrated in FIG. 1. FIG. 4 is an enlarged view of a portion encircled by a dashed-dotted line in the liquid crystal display device illustrated in FIG. 3.

The liquid crystal display device includes a light guide plate 16, which is provided to form an edge-light type backlight. The light guide plate 16 has, as illustrated in FIG. 2, a front surface opposed to the liquid crystal display panel 10, and side surfaces (including a first side surface 22 and a second side surface 24 described later) continuous with the periphery of the front surface. A reflection sheet 18 is disposed on the light guide plate 16 on the side opposite to the liquid crystal display panel 10. Light enters from the side surface of the light guide plate 16, and then is reflected on the reflection sheet 18 or in the inside of the light guide plate 16. The reflected light exits from the front surface opposed to the liquid crystal display panel 10. Note that, an optical sheet 20 is disposed between the light guide plate 16 and the liquid crystal display panel 10. The front surface of the light guide plate 16 has a rectangular shape, and a side surface along one side of the rectangular shape corresponds to the first side surface 22, and a side surface located opposite to the first side surface 22 corresponds to the second side surface 24.

The liquid crystal display device includes a plurality of first light-emitting diodes 26 disposed so as to be opposed to the first side surface 22 of the light guide plate 16. The first light-emitting diodes 26 are point light sources, which are converted into a planar light source by the light guide plate 16. The plurality of first light-emitting diodes 26 are disposed at intervals. Further, a first connector 28 is disposed so as to be opposed to the first side surface 22 of the light guide plate 16. The light guide plate 16 has a notch 29 (recess portion of the first side surface 22) formed therein so as to avoid contacting the first connector 28. The first connector 28 is electrically connected to the plurality of first light-emitting diodes 26. That is, the first light-emitting diodes 26 are connected to a power supply via the first connector 28. At least one first light-emitting diode 26 is disposed on each end portion side of the first side surface 22 with respect to the first connector 28. In other words, out of the first connector 28 and the first light-emitting diode 26, the one opposed to the each end portion of the first side surface 22 is the first light-emitting diode 26. That is, the first connector 28 is disposed on a central portion of the first side surface 22.

The plurality of first light-emitting diodes 26 and the first connector 28 are mounted on a first substrate 30. The first substrate 30 is divided into a plurality of (two in the example of FIG. 4) first divided substrates 32 in a middle of a length direction of the first side surface 22. Although the first connector 28 is illustrated only on one of a pair of the first divided substrates 32 in FIG. 4, the first connector 28 is mounted on each of the pair of the first divided substrates 32. At least one first light-emitting diode 26 is disposed between the first connector 28 mounted on the one of the first divided substrates 32 and the first connector 28 mounted on the other of the first divided substrates 32.

The liquid crystal display device includes a plurality of second light-emitting diodes 34 disposed so as to be opposed to the second side surface 24 of the light guide plate 16. The second light-emitting diodes 34 are point light sources, which are converted into a planar light source by the light guide plate 16. The plurality of second light-emitting diodes 34 are disposed at intervals. Further, a second connector 36 is disposed so as to be opposed to the second side surface 24 of the light guide plate 16. The light guide plate 16 has a notch 37 (recess portion of the second side surface 24) formed therein so as to avoid contacting the second connector 36. The second connector 36 is electrically connected to the plurality of second light-emitting diodes 34. That is, the second light-emitting diodes 34 are connected to the power supply via the second connector 36. At least one second light-emitting diode 34 is disposed on each end portion side of the second side surface 24 with respect to the second connector 36. In other words, out of the second connector 36 and the second light-emitting diode 34, the one opposed to the each end portion of the second side surface 24 is the second light-emitting diode 34. That is, the second connector 36 is disposed on a central portion of the second side surface 24.

The plurality of second light-emitting diodes 34 and the second connector 36 are mounted on a second substrate 38. The second substrate 38 is divided into a plurality of (two in the example of FIG. 4) second divided substrates 40 in a middle of a length direction of the second side surface 24. Although the second connector 36 is illustrated only on one of a pair of the second divided substrates 40 in FIG. 4, the second connector 36 is mounted on each of the pair of the second divided substrates 40. At least one second light-emitting diode 34 is disposed between the second connector 36 mounted on the one of the second divided substrates 40 and the second connector 36 mounted on the other of the second divided substrates 40.

The first connector 28 is disposed so as to be opposed to any one of the second light-emitting diodes 34. The second connector 36 is disposed so as to be opposed to any one of the first light-emitting diodes 26. That is, the first connector 28 and the second connector 36 are disposed without being opposed to each other.

According to this embodiment, the second light-emitting diode 34 is provided opposed to the first connector 28 and the first light-emitting diode 26 is provided opposed to the second connector 36. Therefore, it is possible to maintain a bright state. Thus, uniform brightness can be achieved in the backlight.

Figure 5:
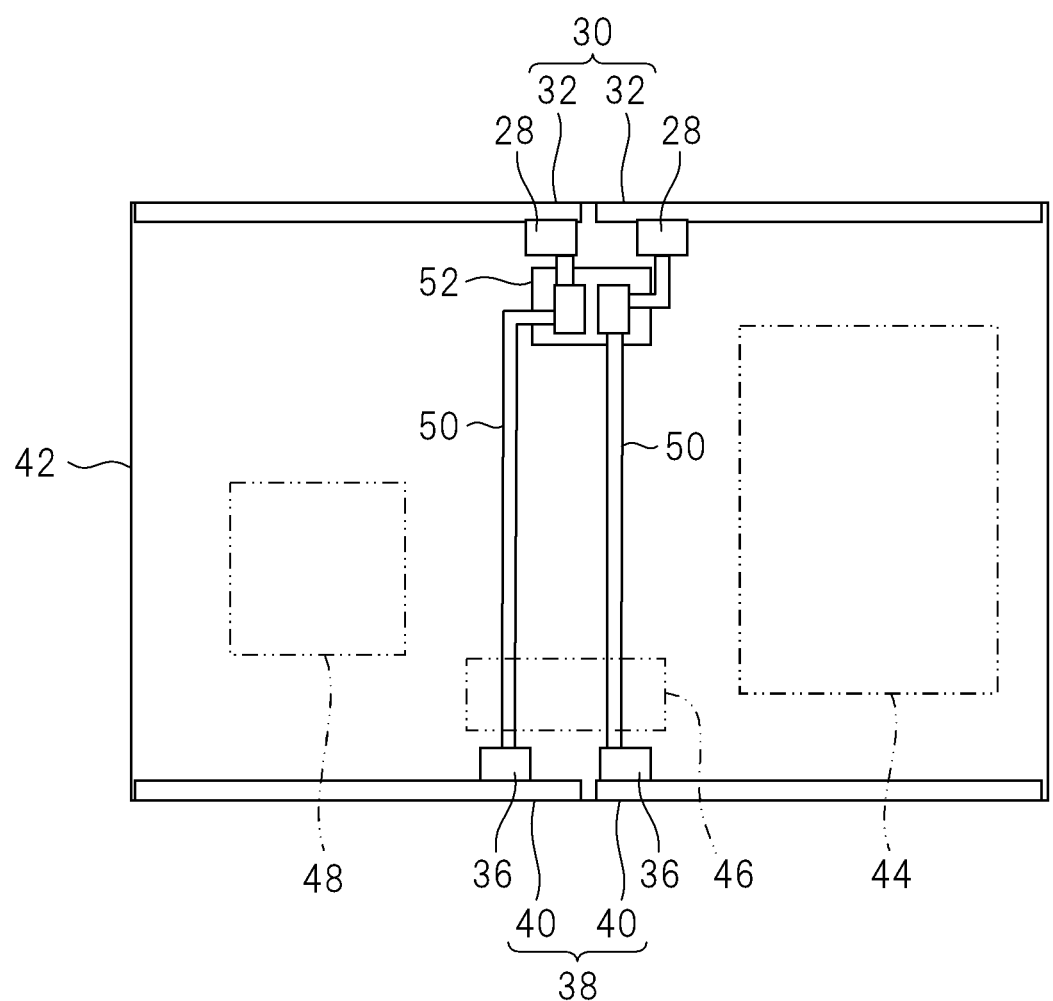
FIG. 5 is a view illustrating an inner side of a lower frame.

FIG. 5 is a view illustrating an inner side of a lower frame 42. As illustrated in FIG. 2, the light guide plate 16 is disposed on the inner side of the lower frame 42. The mold frame 14 is disposed between the lower frame 42 and the upper frame 12.

On the lower frame 42, there are attached a first circuit board 44 including a drive circuit and a power supply circuit for the first light-emitting diodes 26 and the second light-emitting diodes 34, a second circuit board 46 including a timing control circuit, and a third circuit board 48 including a signal circuit. The first connectors 28 and the second connectors 36 are connected to an output connector 52 located at one portion via cables 50, and are connected from the output connector 52 to the first circuit board 44.

In this embodiment, the first connector 28 and the second connector 36 are respectively located at the centers of the first side surface 22 and the second side surface 24 in the length directions thereof. Therefore, it is possible to reduce the length of the cable 50 provided to reach the output connector 52, compared with the case where the first connector 28 and the second connector 36 are respectively disposed at end portions of the first side surface 22 and the second side surface 24 in the length directions thereof.

Figure 6:
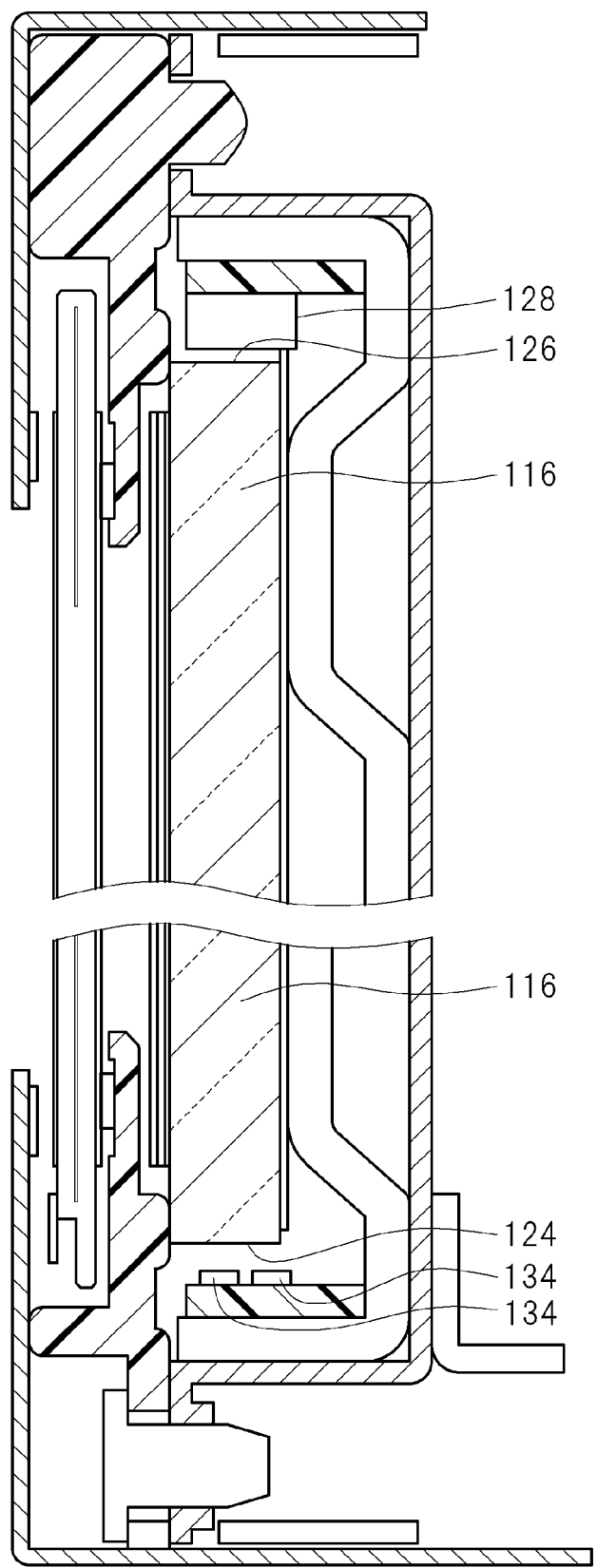
FIG. 6 is a vertical sectional view of a liquid crystal display device according to a modified example of the embodiment.
Figure 7:
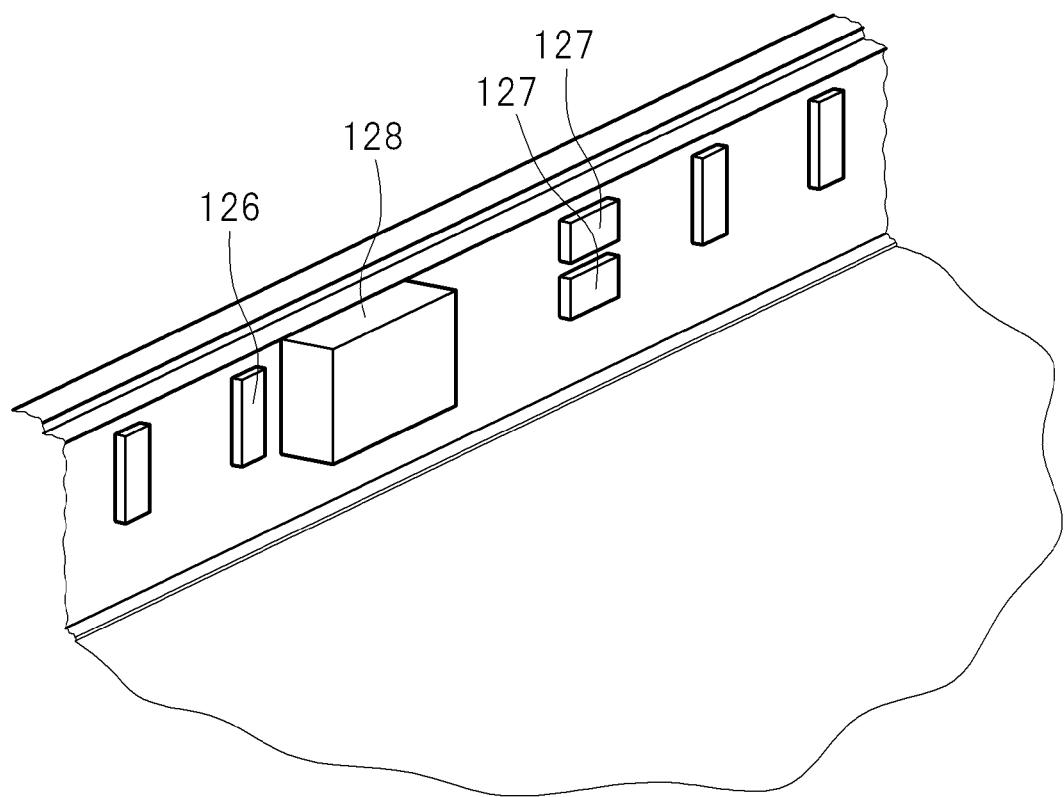
FIG. 7 is an enlarged view of a first substrate of the liquid crystal display device according to the modified example of the embodiment.

FIG. 6 is a vertical sectional view of a liquid crystal display device according to a modified example of the embodiment. FIG. 7 is an enlarged view of the first substrate of the liquid crystal display device according to the modified example of the embodiment.

In this modified example, as illustrated in FIG. 7, the plurality of first light-emitting diodes include, in addition to first light-emitting diodes 126 arranged in a row in a length direction of a first side surface 122, first light-emitting diodes 127 arranged in a plurality of levels in a thickness direction of a light guide plate 116 at a portion adjacent to a first connector 128.

Similarly, as illustrated in FIG. 6, the plurality of second light-emitting diodes include, in addition to second light-emitting diodes (not shown) arranged in a row in a length direction of a second side surface 124, second light-emitting diodes 134 arranged in a plurality of levels in the thickness direction of the light guide plate 116 at a portion adjacent to a second connector (not shown).

According to this modified example, because brightness decreases at positions opposed to the first connector 128 and the second connector (not shown) of the light guide plate 116 due to absence of a light source, brightness is enhanced by providing the first light-emitting diodes 127 or the second light-emitting diodes 134 in a plurality of levels at a position adjacent to the first connector 128 or the second connector (not shown). With this, brightness uniformity can be achieved. Other structures correspond to the contents described in the above-mentioned embodiment.

The present invention is not limited to the embodiment described above, and various modifications may be made thereto. For example, the structures described in the embodiment may be replaced by substantially the same structure, a structure having the same action and effect, and a structure which may achieve the same object.

What is claimed is:

1. A liquid crystal display device, comprising:
a liquid crystal display panel;
a light guide plate, which is provided to form an edge-light type backlight;
a plurality of first light-emitting diodes, which are disposed so as to face a first side surface of the light guide plate;
a first connector, which is not a light-emitting diode, is disposed so as to be opposed to the first side surface of the light guide plate, and electrically connecting the plurality of first light-emitting diodes to a power supply;
a first substrate on which the plurality of first light-emitting diodes and the first connector are mounted substantially along a surface of the first substrate which faces the first side surface of the light guide plate;
a plurality of second light-emitting diodes, which are disposed so as to face a second side surface of the light guide plate, the second side surface being on a side opposite to the first side surface;
a second connector, which is not a light-emitting diode, is disposed so as to be opposed to the second side surface of the light guide plate, and electrically connecting the plurality of second light-emitting diodes to the power supply; and
a second substrate on which the plurality of second light-emitting diodes and the second connector are mounted substantially along a surface of the second substrate which faces the second side surface of the light guide plate, wherein:
the first connector mounted on the first substrate is disposed so as to directly face any one of the plurality of second light-emitting diodes mounted on the second substrate;
the second connector mounted on the second substrate is disposed so as to directly face any one of the plurality of first light-emitting diodes mounted on the first substrate; and
the first connector mounted on the first substrate and the second connector mounted on the second substrate are disposed so as to be offset with respect to each other without directly facing each other.

2. The liquid crystal display device according to claim 1, wherein:
the plurality of first light-emitting diodes comprise: the first light-emitting diodes which are arranged in a row in a length direction of the first side surface; and
the first light-emitting diodes which are arranged in a plurality of levels in a thickness direction of the light guide plate at a portion adjacent to the first connector; and
the plurality of second light-emitting diodes comprise: the second light-emitting diodes which are arranged in a row in a length direction of the second side surface; and the second light-emitting diodes which are arranged in a plurality of levels in the thickness direction of the light guide plate at a portion adjacent to the second connector.

3. The liquid crystal display device according to claim 1, wherein:
the plurality of first light-emitting diodes are arranged along an extension direction of the first side surface of the light guide plate substantially along the surface of the first substrate which faces the first side surface of the light guide plate;
the plurality of second light-emitting diodes are arranged substantially along the surface of the second substrate which faces the second side surface of the light guide plate along an extension direction of the second side surface of the light guide plate which is same as the extension direction of the first side surface of the light guide plate;
the first and second connectors are offset with respect to each other in the extension direction of the first and second side surfaces of the light guide plate;
at least one of the plurality of first light-emitting diodes is disposed on each end portion side of the first side surface with respect to the first connector; and
at least one of the plurality of second light-emitting diodes is disposed on each end portion side of the second side surface with respect to the second connector.

4. The liquid crystal display device according to claim 2, wherein:
at least one of the plurality of first light-emitting diodes is disposed on each end portion side of the first side surface with respect to the first connector; and
at least one of the plurality of second light-emitting diodes is disposed on each end portion side of the second side surface with respect to the second connector.

5. The liquid crystal display device according to claim 1, wherein:
the first substrate is divided into a plurality of first divided substrates in a middle of a length direction of the first side surface; and the second substrate is divided into a plurality of second divided substrates in a middle of a length direction of the second side surface.

6. The liquid crystal display device according to claim 2, wherein:
the first substrate is divided into a plurality of first divided substrates in a middle of the length direction of the first side surface; and
the second substrate is divided into a plurality of second divided substrates in a middle of the length direction of the second side surface.

7. The liquid crystal display device according to claim 3, wherein:
the first substrate is divided into a plurality of first divided substrates in a middle of a length direction of the first side surface; and
the second substrate is divided into a plurality of second divided substrates in a middle of a length direction of the second side surface.

8. The liquid crystal display device according to claim 4, wherein:
the first substrate is divided into a plurality of first divided substrates in a middle of the length direction of the first side surface; and
the second substrate is divided into a plurality of second divided substrates in a middle of the length direction of the second side surface.

9. The liquid crystal display device according to claim 5, wherein:
the first connector is mounted on each of a pair of the first divided substrates;
at least one of the plurality of first light-emitting diodes is disposed between the first connector mounted on one of the pair of the first divided substrates and the first connector mounted on another of the pair of the first divided substrates;
the second connector is mounted on each of a pair of the second divided substrates; and
at least one of the plurality of second light-emitting diodes is disposed between the second connector mounted on one of the pair of the second divided substrates and the second connector mounted on another of the pair of the second divided substrates.

10. The liquid crystal display device according to claim 6, wherein:
the first connector is mounted on each of a pair of the first divided substrates;
at least one of the plurality of first light-emitting diodes is disposed between the first connector mounted on one of the pair of the first divided substrates and the first connector mounted on another of the pair of the first divided substrates;
the second connector is mounted on each of a pair of the second divided substrates; and
at least one of the plurality of second light-emitting diodes is disposed between the second connector mounted on one of the pair of the second divided substrates and the second connector mounted on another of the pair of the second divided substrates.

11. The liquid crystal display device according to claim 7, wherein:
the first connector is mounted on each of a pair of the first divided substrates;
at least one of the plurality of first light-emitting diodes is disposed between the first connector mounted on one of the pair of the first divided substrates and the first connector mounted on another of the pair of the first divided substrates;
the second connector is mounted on each of a pair of the second divided substrates; and
at least one of the plurality of second light-emitting diodes is disposed between the second connector mounted on one of the pair of the second divided substrates and the second connector mounted on another of the pair of the second divided substrates.

12. The liquid crystal display device according to claim 8, wherein:
the first connector is mounted on each of a pair of the first divided substrates;
at least one of the plurality of first light-emitting diodes is disposed between the first connector mounted on one of the pair of the first divided substrates and the first connector mounted on another of the pair of the first divided substrates;
the second connector is mounted on each of a pair of the second divided substrates; and
at least one of the plurality of second light-emitting diodes is disposed between the second connector mounted on one of the pair of the second divided substrates and the second connector mounted on another of the pair of the second divided substrates.

13. The liquid crystal display device according to claim 1, wherein at least a majority of the plurality of first and second light-emitting diodes and the first and second connectors lie in a same plane.

* * * * *